COMPUTER CONTROLLED OUTPUT TAPE BATCHING ARRANGEMENT

Filed June 11, 1965 4 Sheets-Sheet 1

INVENTORS C. B. CUSHING
F. R. MICHAEL
BY Lucian C. Canepa
ATTORNEY

United States Patent Office 3,403,384

Patented Sept. 24, 1968

3,403,384

COMPUTER CONTROLLED OUTPUT TAPE BATCHING ARRANGEMENT

Carole B. Cushing, Malden, and Frank R. Michael, Princeton, N.J., assignors to Bell Telephone Laboratories, Incorporated, New York, N.Y., a corporation of New York Filed June 11, 1965, Ser. No. 463,274
21 Claims. (Cl. 340—172.5)

ABSTRACT OF THE DISCLOSURE

The "turn-around" time of a computing system is reduced by examining various system parameters to determine whether or not the system should terminate the current output tape and begin output data batching associated with the next computation on a new tape. In this way the lengths of the respective tapes are terminated in a systematic manner thereby to achieve more efficient utilization of a plurality of computer-associated data outputting structures.

This invention relates to digital computing arrangements and, more specifically, to a computer organization which reduces computation delays by efficiently employing a plurality of computer-associated data outputting structures.

Present day computation centers conventionally employ a relatively large capacity, general purpose digital computer and peripheral data outputting equipment associated therewith, e.g., card punches, printers and smaller size output controlling computers, to accommodate the wide range of diverse problems generated by programmer-subscribers. In a typical operation, the principal computer sequentially processes a set of input problems and batches, i.e. stores, the resulting output information on an output tape. After a prefixed computational period has elapsed, the computer is electrically switched to a different tape console for output batching, with the previous output tape being transferred to the data outputting computer(s), printer(s) and/or card punch(es). These latter structures then function to convert the output information into a form meaningful to the problem-initiating programmer.

One figure of merit for a computation center is the "turn-around time," i.e., the total elapsed period between delivery of a problem to the computation center and receipt by the programmer of his results. When turn-around time is short, e.g., an hour or two, the programmer can make several sequential runs at a problem, that is, get several related programs on the computer, in a working day.

By reason of the rapid speeds characterizing modern general purpose computers, a relatively large portion of the turn-around time is attributable to the data outputting equipment and, more particularly, to the inefficient use thereof caused by poor output tape batching. In order to reduce such delays, one solution attempted in this area has been to employ programmer estimates of the quantum of output data he expects from his problem to selectively group computer input problems, with intervening output tape terminating operations being utilized between successive program groups.

However, this has not proven entirely satisfactory in practice because of gross programmer miscalculations. In addition such errors are compounded by programs that fail to run because of some technical error, and which therefore produce only a negligible percentage of the anticipated data. Conversely, erroneous output statements in programs may increase the expected output information by many fold.

It is thus an object of the present invention to provide an improved computation center organization.

More specifically, an object of the present invention is the provision of a digital computer arrangement which efficiently employs peripheral data outputting structures associated therewith.

Another object of the present invention is the provision of a computation center organization which controls the relative amount of information placed on successively-employed computer output tapes to reduce subscriber turn-around time.

These and other objects of the present invention are realized in a specific, illustrative program-controlled computer output tape batching arrangement which regulates the relative lengths of successively-employed computer output tapes for purposes of most efficiently employing peripheral data outputting embodiments. The arrangement includes control circuitry responsive to the busy or idle status of the output processing equipment for transmitting empirically-determined optimum output tape lengths to the computer. Following each executed computational problem, the computer operates on the optimal tape information, and also on data relating to the present computer output tape size, in accordance with a monitor program algorithm stored therein.

If the existing output tape size exceeds any of the optimal parameters generated by the control circuitry, the tape is terminated and the computer is switched to a new tape console to initiate output batching thereon. A previously-completed tape may then be transferred to the next available outputting embodiment for processing.

It is therefore a feature of the present invention that a computation center organization include a digital computer, a plurality of tape consoles selectively connectable to the computer, a plurality of data outputting structures, and control circuitry responsive to the relative busy or idle status of the outputting structures for supplying control signals to the computer.

It is another feature of the present invention that a computation center organization include a computer, a plurality of tape consoles selectively connectable to the computer, a plurality of data outputting structures, control circuitry responsive to the relative busy or idle status of the outputting structures for supplying information embodying optimal data processing times to the computer, and stored program controlled circuitry included in the computer responsive to the information supplied thereto by the control circuitry for selectively connecting the tape consoles to the computer.

A complete understanding of the present invention and of the above and other features, advantages and variations thereof may be gained from a consideration of the following detailed description of an illustrative embodiment thereof presented hereinbelow in conjunction with the accompanying drawing, in which.

Throughout the drawing, the same element, when shown in more than one figure, is designated by a like reference numeral.

Figure 2:
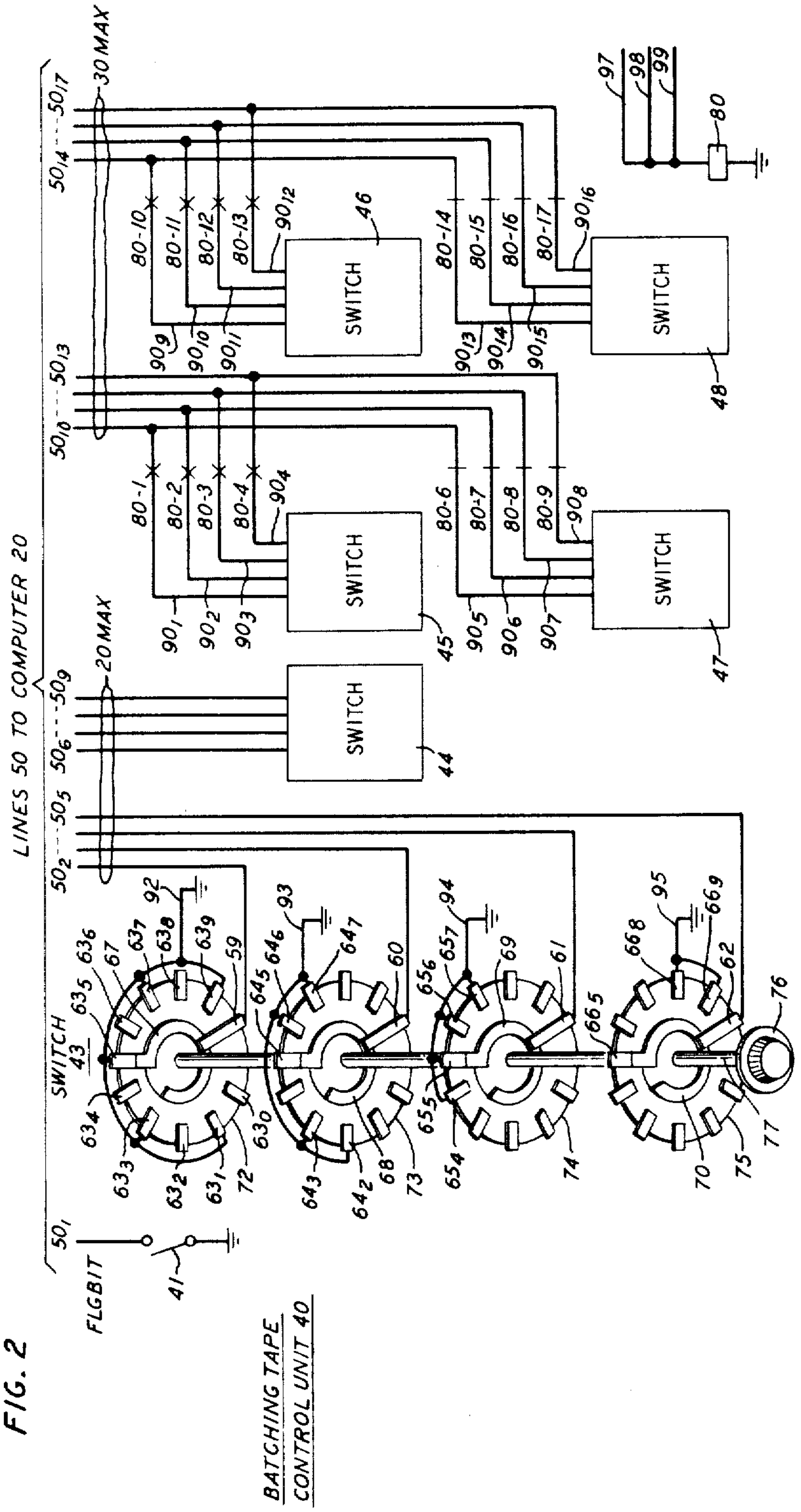
FIG. 2 illustrates in detail a batching tape control unit 40 included in FIG. 1.

It is noted that FIG. 2 employs a type of notation referred to as "detached-contact" in which an X, shown intersecting a conductor, represents a normally open contact of a relay, and a bar, shown intersecting a conductor at right angles, represents a normally closed contact of a relay, "normally" referring to the unenergized condition of the relay. The principles of this type of notation are described in an article entitled, "An Improved Detached-Contact-Type of Schematic Circuit Drawing," by F. G. Meyer in the September 1955 publication of the American Institute of Electrical Engineers Transactions, Communications and Electronics, vol. 74, pages 505–513.

Figure 1:
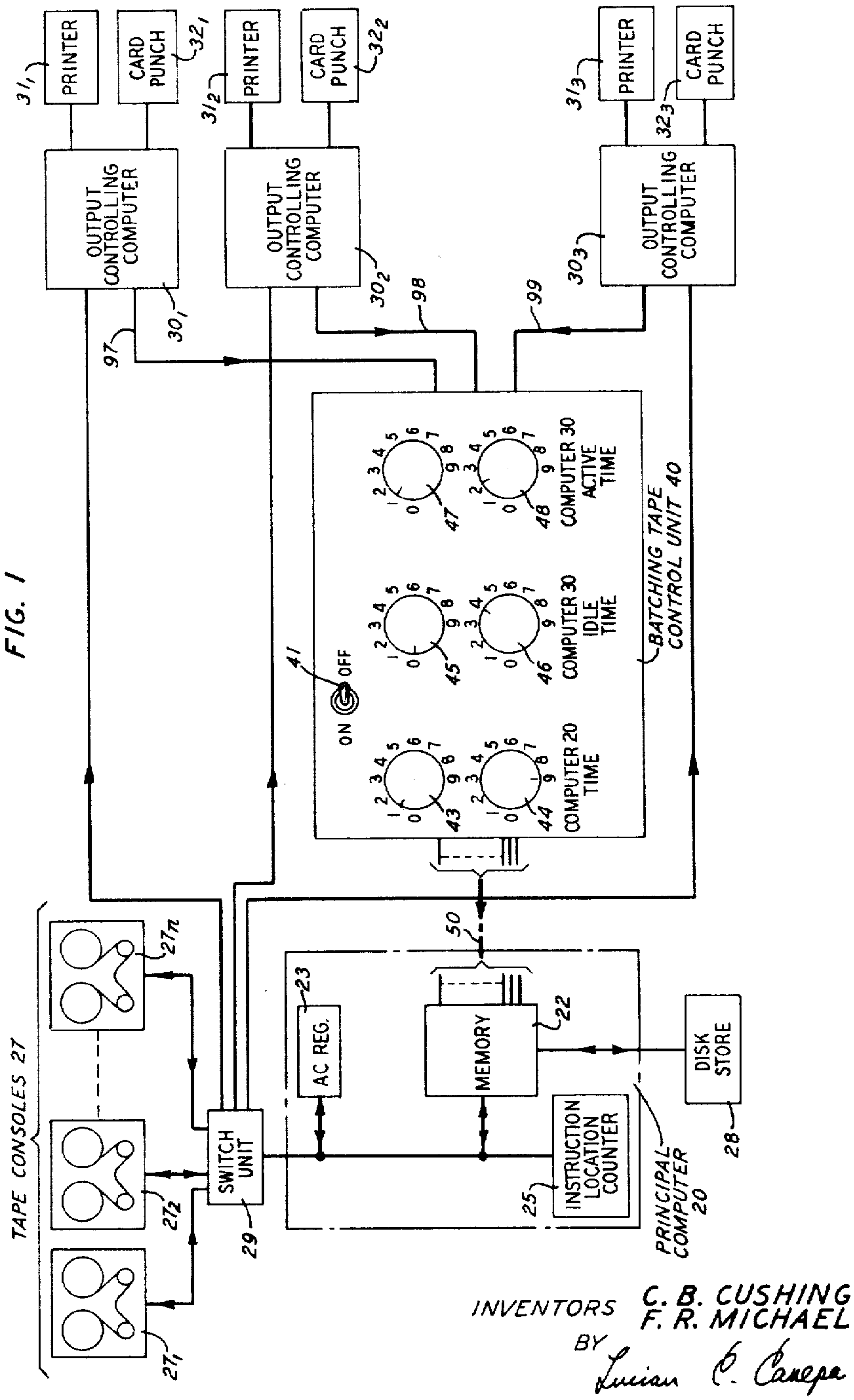
FIG. 1 is a diagram of a specific, illustrative digital computation organization which embodies the principles of the present invention.

Referring now to FIG. 1, there is shown a specific, illustrative computation center organization comprising a general purpose digital computer 20 which includes an accumulator (AC) digital register 23, an instruction location counter 25 and a memory 22 all of a conventional type. The computer 20 is selectively connectable by a switch unit 29 to any of a plurality of magnetic tape consoles $27_1$ through $27_n$ for purposes of translating digital information therebetween, and additionally connectable to an ancillary magnetic disk store 28 for transposing data between the computer memory 22 and the store 28.

The switching unit 29 is further operative to selectively connect the tape consoles 27 to any of three output controlling computers $30_1$ through $30_3$ which are of a small size relative to the principal computer 20. Each of the computers 30 operates on the digital information supplied thereto by a tape console 27 by energizing either a printer 31 or a card punch 32 associated therewith. Accordingly, the printers 31 and card punches 32 convert the computer-generated digital data stored on magnetic tape into a form suitable for evalution by programmers, viz., a printed record or a deck of punched cards.

The output controlling computers $30_1$ through $30_3$ communicate the idle or busy status thereof, respectively represented by the presence or absence of an electrical signal, to a batching tape control unit 40 via three leads 97 through 99. The unit 40 includes an on/off switch 41 and three sets of two associated rotary switches 43 and 44, 45 and 46 and 47 and 48 for supplying optimal output tape batching parameters, measured in terms of computer data processing time, to the computer memory 22 by way of a plurality of leads 50. More particularly, the switches 43 (tens) and 44 (units) supply a two-digit decimal number representing the maximum running time for the principal computer 20 measured in terms of the accumulated computer 20 computation time which has elapsed since the output batching tape has been last changed. When this quantity is exceeded by any series of computer input problems, the output tape then in use by the computer 20 will be terminated in the manner specified hereinbelow. Similarly, the switches 45 (tens) and 46 (units) generate a maximum accumulated data processing time for the computers 30, again given by a two-digit decimal number, which is to be employed when any of the three computers 30 is idle. Correspondingly, the switches 47 (tens) and 48 (units) embody a maximum two-digit decimal running time for the computer 20, which is measured in terms of accumulated processing time for the computers 30 when none is idle.

During typical operation of the computer 30, a continuous set of input problems, commonly designated "jobs," are sequentially supplied thereto. Such problems may emanate from any of the plurality of input equipment items well known in the art of alternatively, these jobs may be stored on tape and transmitted to the computer from one of the tape consoles 27.

When each job is completed by the computer 20, the instruction location counter 25 transfers control of the computer to a multipurpose monitor program permanently stored in the memory 22. First, the monitor program is adapted to effect all the executive type operations required to terminate the problem just run. Next, the monitor does the accounting for the finished job by determining the expired computer 20 running time, the number of lines generated by the job and to be printed by a printer 31, and the number of cards to be punched by a punching unit 32, for purposes of billing the computation center subscriber who initiated the job. Then, in accordance with one aspect of the present invention, the monitor program examines the accounting information and the maximum running time parameters supplied thereto by the batching tape control unit 40 to determine whether or not the computer should terminate the current output tape for data outputting and begin output batching for the next job on a new tape console 27. Finally, this program initiates preparation directed to accepting the next computational problem to be run.

Turning now to FIG. 2, there is shown in particular detail the tape batching control unit 40. The rotary switch 43 included therein, which is representative of the other switches 44 through 48, comprises four wafers 72 through 75 mechanically ganged on a common shaft 77 which is controlled by a knob 76. The switch 43, in correspondence with the other switches 44 through 48, is adapted to supply a four-bit binary number, identifying a single decimal character, to four of the unit 40 output leads 50, in this case the leads $50_2$ through $50_5$. The leads $50_2$ through $50_5$ are respectively connected to four contact terminals 59 through 62 mounted on the wafers 72 through 75, with "1" and "0" binary designations being respectively embodied by the presence or absence of a ground potential being impressed on an output lead.

In addition to the contact terminals 59 through 62, the wafers 72 through 75 respectively include thereon ten additional contact terminals $63_0$ through $63_9$, $64_0$ through $64_9$, $65_0$ through $65_9$, and $66_0$ through $66_9$ thereon (selectively shown in FIG. 2), wherein the subscripts identify the particular decimal character "0" through "9" partially identified by that particular switch 43 contact terminal. Finally, shorting members 67 through 70 are respectively affixed to the wafers 72 through 75, and adapted to selectively contact the associated terminals 63 through 66, while maintaining a permanent connection with the the corresponding wafer output contact terminals 59 through 62.

The ten contacts in each set 63 through 66 are respectively interconnected by an associated set of grounded connecting leads 92 through 95, in accordance with the digital pattern shown in Table I, infra, for purposes of identifying the desired decimal number by a conventional binary counting code.

TABLE I

| Decimal Character and Contact Subscript | Wafer | | | |
|---|---|---|---|---|
| | 75 | 74 | 73 | 72 |
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |

More specifically, each of the contact terminals 63 through 66 is grounded or ungrounded when a binary "1" or "0," respectively, apepars in the corresponding row and column of Table I. For example, examining the wafer 72 which corresponds to the least significant binary digit shown in the rightmost column of Table I, it is observed that the grounding lead 92 is conected to the contacts $63_1$, $63_3$, $63_5$, $63_7$ and $63_9$, and not connected to the contacts $63_0$, $63_2$, $63_4$, $63_6$, and $63_8$.

To further illustrate the operation of the switch 43, assume that the knob 76 and shaft 77 position the shorting members 67 through 70 to the decimal "5" position in contact with the terminal $63_5$ through $66_5$, as shown in FIG. 1. Accordingly, ground potentials are applied to the leads $50_2$ (via the shorting member 67 and the output contact terminal 59) and $50_4$ (via the member 69 and terminal 61), but not applied to the leads $50_3$ and $50_5$ by reason of the ungrounded contact terminals $64_5$ and $66_5$. Accordingly, the binary word 0101 is supplied to the group of leads $50_2$ through $50_5$, hence properly communicating the desired decimal "5" to the computer memory 22. In a similar manner, the switches 44 through 48 are respectively operable to supply binary signals representative of a single decimal number to corresponding sets of four leads $50_6$ through $50_9$, $90_1$ through $90_4$, $90_9$ through $90_{12}$, $90_5$ through $90_8$ and $90_{13}$ through $90_{16}$ respectively connected thereto.

The control leads 97 through 99, which are respectively energized when the associated outputting computers $30_1$ through $30_3$ are idle, are connected to a relay energizing winding 80 (FIG. 2). When the winding 80 is in a passive state, viz., when all the computers 30 are active, the switch 47 and 48 output leads $90_5$ through $90_8$ and $90_{13}$ through $90_{16}$ are respectively connected to the principal computer 20 via the leads $50_{10}$ through $50_{13}$ and $50_{14}$ through $50_{17}$ through a plurality of normally closed relay contact pairs 80–6 through 80–9 and 80–14 through 80–17. Accordingly, the two-digit decimal number generated by the computer 30 active time switches 47 and 48 is transmitted to the computer 20.

Conversely, when one of the computers 30 is idle, the corresponding energized lead 97, 98 or 99 activates the relay winding 80, thereby respectively connecting the switches 45 and 46 to the conductors $50_{10}$ through $50_{13}$ and $50_{14}$ through $50_{17}$ via a plurality of normally open relay contacts 80–1 through 80–4 and 80–10 through 80–13, while opening the contact pairs 80–6 through 80–9 and 80–14 through 80–17. Hence, under these conditions, the computer 30 idle time switches 45 and 46 supply digital information to the computer 20.

Finally, an on/off switch 41 is employed in the batching tape control unit 40 to selectively ground the lead $50_1$ when the switch 41 is in an on state, indicating that the automatic tape baching feature described hereinbelow is to be utilized.

As mentioned earlier, a principal factor in reducing turn-around delay for subscribers of a computation center, e.g. the FIG. 1 organization, is efficient employment of the peripheral data outputting equipment, viz., the computers 30, the printers 31 and the card punches 32. This, in turn, requires an organization for terminating the successively-employed output batching tapes, used by the principal computer 20, at optimal times.

In accordance with one aspect of the present invention, we have discovered that the data outputting equipment will be efficiently employed when the computational results generated by the principal computer 20 and batched on any given output tape do not exceed any of a set of optimal parameters therefor. To review the three illustrative criteria heretofore mentioned, the computer 20 is arranged to switch output tapes whenever the accumulated running time of the computer on the presently employed batching tape (1) Exceeds the setting therefor embodied in the tape control unit 40 switches 43 and 44;

(2) Results in output processing data which exceeds the computer 30 output data processing time established by the switches 45 and 46 when any of the computers 30 is idle; or, finally, (3) Produces output processing data which exceeds the time parameter established for computer 30 processing by the dials 47 and 48 which obtains when each of the computers 30 is busy processing output data.

These optimum settings for the switches 43 through 48 may be derived experimentally by trying various settings of these switches under actual operating conditions characterizing each particular computation center organization. Alternatively, such settings may be obtained in an empirical manner from an examination of the past use of the computation center. For example, where the principal and output computers 20 and 30 shown in FIG. 1 respectively comprise IBM 7094 and 1460 embodiments, settings for the switches 43 and 44, 45 and 46, and 47 and 48 of 19, 4 and 11 minutes have been found desirable.

Figure 3:
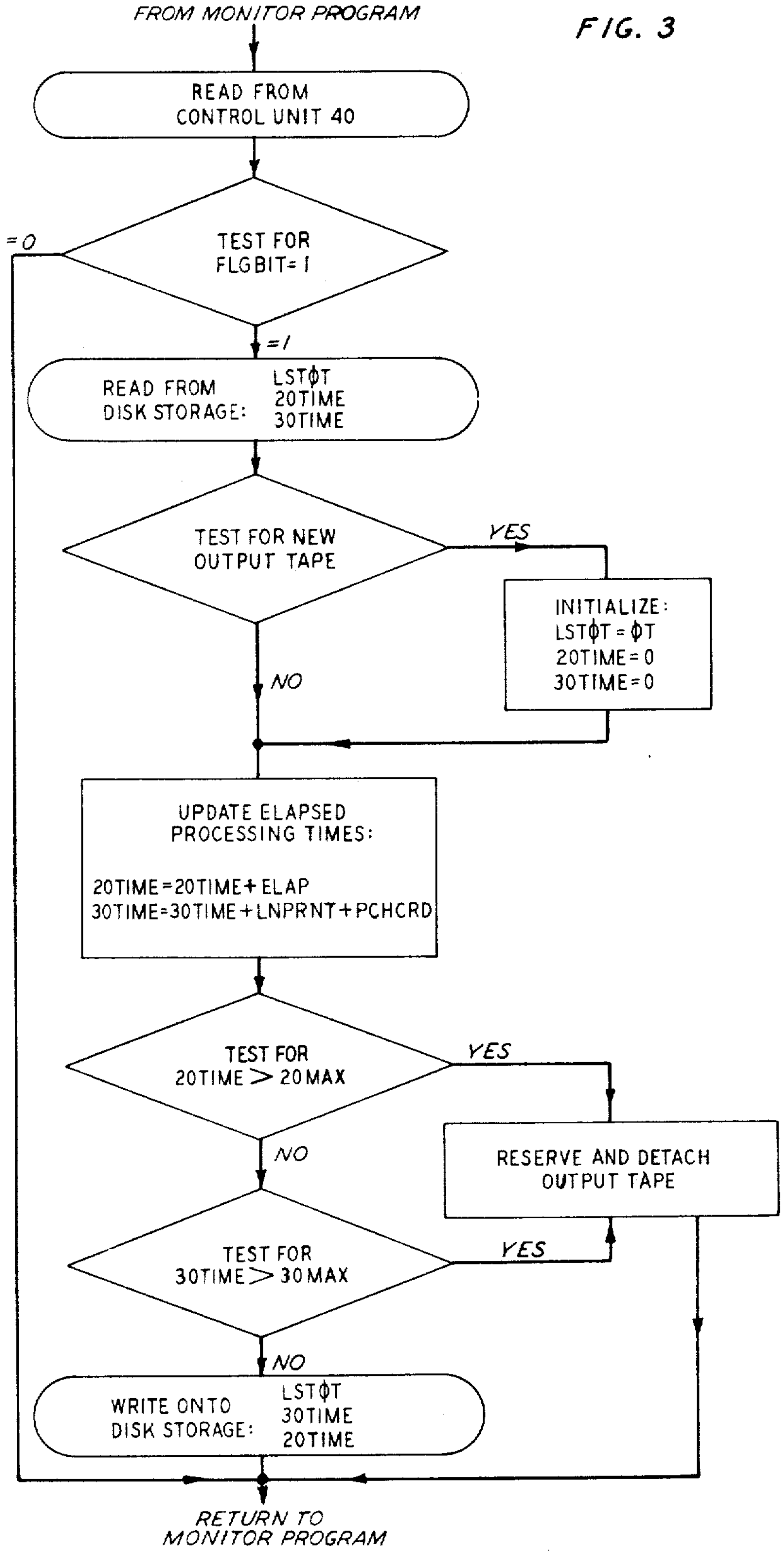
FIG. 3 is a signal flow diagram depicting the functional operation characterizing a digital computer 20 shown in FIG. 1.

To utilize the above-described output tape terminating parameters communicated to the computer 20, the monitor program stored in the computer memory 22 includes as an integral part thereof a tape terminating program algorithm. A signal flow diagram for this algorithm is depicted in FIG. 3. By way of initialization, the computer 20 first reads information comprising the on/off status of the switch 41 and the optimal tape terminating parameters from the control unit 40 via the conductors 50. More specifically, the switch 41 single status bit appearing on the lead $50_1$ is placed in a memory 22 location denoted FLGBIT; the computer 20 maximum allowable processing time which is included on the conductors $50_2$ through $50_9$ is stored in a memory location 20MAX; and the computer 30 maximum data output processing time is inserted into a memory 22 location 30MAX.

The algorithm is operable to next test the switch 41 on/off bit stored in FLGBIT, and transfer out of the batching tape terminating algorithm back to the main flow of the monitor program when a "0" is detected, indicating that the unit 40 is not in use. If a "1" is uncovered in the FLGBIT location, the program directs the computer to read into the memory 22 from the disk store 28: (1) the serial number of the output tape used in the last computed job and store this in a memory location denoted LSTφT; (2) the serial number of the presently utilized output tape and register this number in a memory 22 address φT; (3) the total accumulated computer 20 running time which has expired since the present output tape was started, and store this item in a memory location 20TIME; and (4) the total computer 30 processing time which has accumulated since the present output tape was begun, and to store this information in a location 30TIME.

The computer next compares the serial number of the present output tape stored in φT with the quantity stored in LSTφT. If the numbers are different, this indicates that a new output tape has been started for the job just run. Accordingly, as indicated by the "Yes" branch for the testing operation shown in FIG. 3, the quantities stored in LSTφT, 20TIME and 30TIME are initialized to reflect the fact that a new tape has been started. Specifically, the present output tape serial number is stored in LSTφT, and the accumulated computer 20 and computer 30 elapsed processing times stored at the addresses 20TIME and 30TIME are initialized to zero.

After the above processing has been accomplished, or in any case if no change in output tape has been detected, i.e., if the contents of LSTφT and φT are equal, the quantities stored in 20TIME and 30TIME are updated to embody the computer 20 running time, and computer 30 output data processing time generated by the job just run. In particular, the computer 20 time which elapsed in processing the last job (stored in a memory 22 address ELAP) is added to the prior accumulated total 20 computer running time. Similarly, to the computer 30 accumulated output processing time is added the time associated with the number of punched cards (stored at an address PCHCRD) and the number of lines to be printed (stored at a memory location LNPRNT) required to output the information generated by the problem just completed.

At this point, the algorithm tests first the computer 20 accumulated time stored in 20TIME and the computer 30 accumulated data processing time contained in 30TIME to determine if either of these quantities exceeds the maximum parameter therefor, i.e., the quantities stored in 20MAX or 30MAX, respectively. If either of these optimal parameters is exceeded, the computer 20 terminates the presently utilized output tape, reserves this tape for subsequent computer 30 outputting, reserves and seizes a new output tape console 27 for output batching thereon, and returns to the main monitor program.

On the other hand, if neither of the tape terminating parameters 20MAX or 30MAX is less than the coresponding quantities in 20TIME or 30TIME, respectively, the computer 20 reads the quantities located in LSTφT, 20TIME and 30TIME from the memory 22 onto the disk store 28 for recall after the next job is completed. Finally, control of the computer 20 is returned via the instruction location counter 25 to the monitor program in order to accept and process the next computation job.

Figure 4:
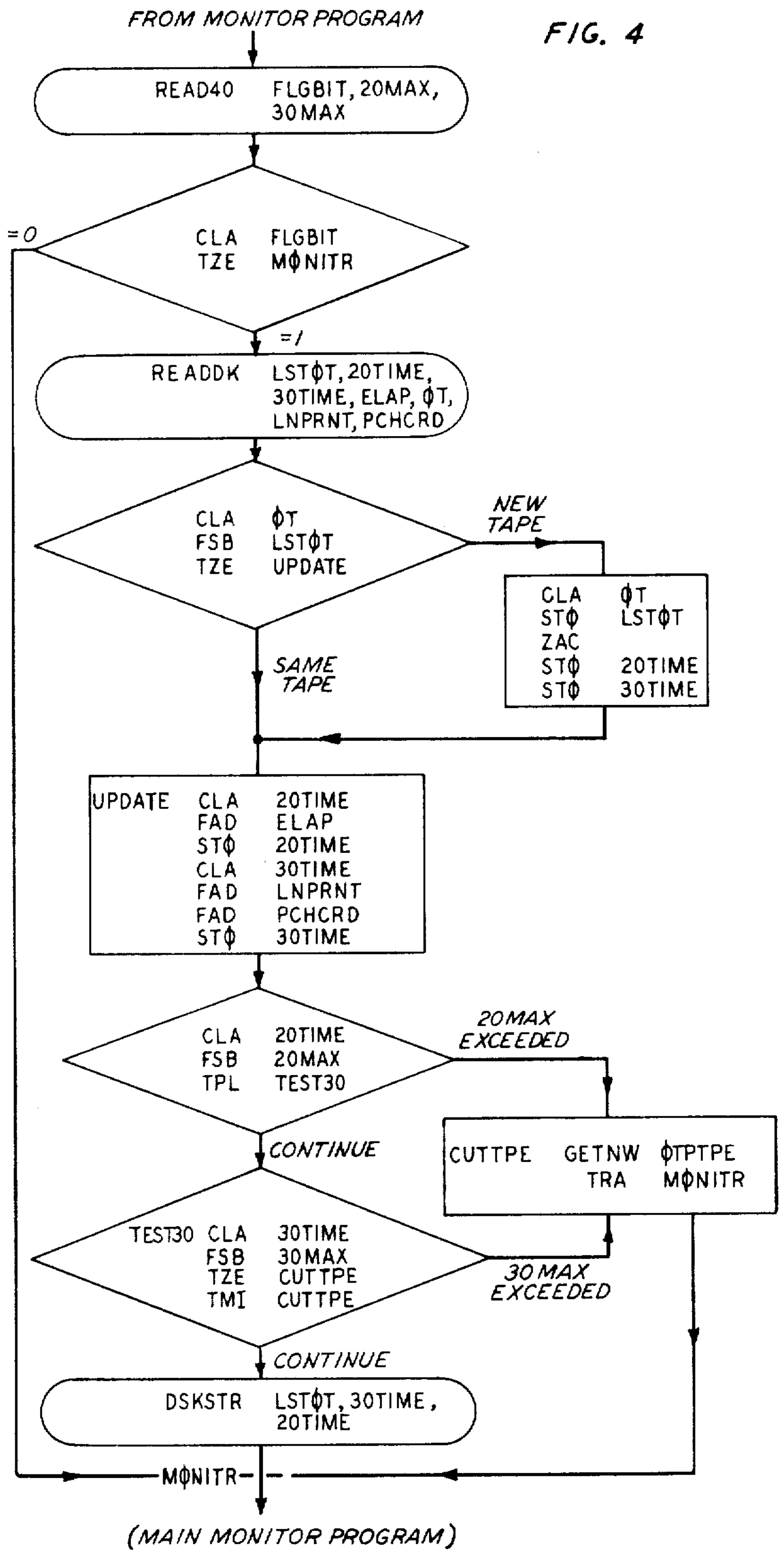
FIG. 4 is a program listing embodying the flow diagram shown in FIG. 3.

The particular nature of the basic stored program algorithm for selectively terminating the computer 20 batching tape is shown in modified FAP assembly language form in FIG. 4. It is noted that the instructions shown therein are functionally grouped in flow diagram form to comprise an exact graphic equivalence with the corresponding algorithm shown in FIG. 3.

The first listed READ40 instruction comprises a call, or transfer to a reading subroutine rather than a single machine operation, and is operative to place the switch 41 status indicating bit appearing on the line $50_1$ into the memory 22 storage location FLGBIT; to read the computer 20 maximum running time parameter appearing on the leads $50_2$ through $50_9$ into the storage location 20MAX; and to insert the computer 30 maximum processing time into the location 30MAX.

In testing to determine the relative operational status of the batching tape control unit 40, the computer 20 clears the AC register 23 and adds thereto the contents of the storage location FLGBIT. The next instruction (TZE) transfers the program to a storage address MφNITR, to return control of the computer 20 to the main monitor program, if a zero is included in the accumulator 23, which occurs only when the switch 41 is off.

Assuming the batching control unit 40 to be operative, a read from the disk store 28 subroutine READDK reads the above-defined computer 20 and computer 30 accumulated processing times, the present output tape serial number, and the accounting data previously generated by the monitor program, from the disk store 28 into the memory 22 locations 20TIME, 30TIME, φT, ELAP, LNPRNT and PCHCRD. It is noted that the monitor program is treated as having stored the quantities φT, ELAP, LNPRNT, and PCHCRD in the disk store 28 during the accounting portion thereof.

The next executed old tape-new tape comparison is accomplished by first placing the present output tape number φT in the accumulator 23 and subtracting (FSB) therefrom the number stored in LSTφT, which is representative of the output tape employed before the last problem was run. If a zero is detected, the TZE UPDATE instruction transfers computer 20 program control via the instruction location counter 25 to the data updating portion of the program beginning with the instruction UPDATE since, under these conditions, the output data for the previous computation was not batched onto a new output tape.

However, if a zero is not generated by the above subtraction, the tape serial numbers are necessarily different, thereby indicating that a new output tape has been started with the problem just completed. Hence, the quantities stored in LSTφT, 20TIME and 30TIME must be initialized, as shown and discussed with respect to FIG. 3, since all accumulated quantities must now be restarted at zero. Accordingly, the present tape number φT is placed in the accumulator (CLAφT) and stored (STφ) in location LSTφT. Next, a zero is placed in the AC register 23 (ZAC) and stored, first in the location 20TIME indicating that no computer 20 time has expired while the new tape has been employed (STφ 20TIME), and also stored in the location 30TIME signifying that the heretofore accumulated computer 30 processing time is zero (STφ 30TIME).

For either of the above-considered output tape conditions, the computer 20 next proceeds to the instructions starting at the location UPDATE for purposes of reflecting the computer 20 running time and the computer 30 outputting data processing time, which are associated with solving the problem just run, in the corresponding quantities stored in 20TIME and 30TIME. First the contents of 20TIME is placed in the accumulator 23 and the computer 20 running time which has elapsed during the previous computational problem stored in ELAP is added thereto (FAD ELAP), with the augmented accumulated computer 20 elapsed time being stored (STφ) at the location 20TIME. Similarly, the computer 30 processing time is updated by placing the contents of 30TIME in the accumulator 23, adding thereto both the quantities stored in location LNPRNT (the printing time generated by the last job) and PCHCRD (the card punching time generated as a result of the last computation), and storing (STφ) the updated sum in 30TIME.

In the next functional portion of the instant algorithm, the accumulated computer 20 time is tested to determine whether the maximum time therefor has been exceeded. This is accomplished by subtracting the parameter stored in 20MAX from the accumulation in 20TIME and examining the subtraction result. If the result is positive, the expired computer 20 time does not exceed the parameter in 20MAX, and the program proceeds (TPL) to test the updated items in 30TIME, beginning with instruction TEST30. If not, i.e., if the subtraction yields a zero or negative result, the elapsed time in 20TIME is at least equal to that in 20MAX, and the computer proceeds under the action of the instruction location counter 25 to the next following instruction CUTTPE. This order word includes a call to a subroutine GETNW which is operative to reserve and detach the present output tape, and acquire a new tape unit for further computation. Upon completion of the subroutine, the TRA instruction transfers computer 20 control to the main monitor program.

In a similar manner, the accumulated computer 30 processing time stored in 30TIME is tested by subtracting therefrom the maximum parameter therefor stored in 30MAX. If a zero (TZE) or minus (TMI) result is obtained, the maximum computer 30 processing time has at least been expended. Hence, control of the computer 20 is transferred to the instruction CUTTPE to acquire a new output tape, and computer 20 control is returned to the monitor program.

However, if the quantity in 30TIME is greater than the parameter in 30MAX, indicating that the present output tape is acceptable for further outputting by the computer 20, a DSKSTR subroutine is enabled to store the contents of LSTφT, 30TIME, and 20TIME in the disk store 28 to be recalled the next time the monitor program is employed.

In over-all terms, the FIG. 1 arrangement has been therefore shown by the above to efficiently employ peripheral output equipment, viz., the computers 30, the printers 31, and the card punches 32 by automatically limiting successively employed computer 20 output batching tapes to a desired length. This has been accomplished by employing the tape batching control unit 40, which is responsive to the busy or idle status of the computers 30 for supplying the optimal data processing parameters to the computer memory 22. The principal computer 20, in turn, includes a tape terminating program, called upon each time a new computation job is completed, which determines whether any of these parameters has been exceeded and, therefore, whether or not a new output tape should be obtained.

It is to be understood that the above-described arrangement is only illustrative of the application of the principles of the present invention. Numerous other arrangements may be devised by those skilled in the art without departing from the spirit and scope thereof. For example, any number of principal computers 20, output controlling computers 30, printers 31, card punchers 32 and/or other data inputting and outputting devices might well be employed in the FIG. 1 arrangement. For each such arrangement, new optimal timing parameters which most efficiently employ the included data outputting equipment would then be obtained and utilized.

In addition, each of the switches 43 through 48 is shown in FIG. 2 as comprising four ganged wafer members, and as generating a straight binary representation of a single decimal character. However other switch structures, such as matrix organizations, may be employed in place of the particular switches 43 through 48 and, moreover, such switching arrangements may generate any coding for the associated decimal number, such as the well known binary-coded decimal representation thereof.

Finally, other optimization parameters in addition to, or in substitution for the three criteria described hereinabove may well be utilized.

What is claimed is:

1. In combination, a computer adapted to process a plurality of computational problems and to provide respective sets of output data signals for said problems, a plurality of data outputting structures, control circuitry connected to said computer and to said outputting structures for supplying data output batching control signals to said computer, and means included in said computer for comparing said batching control signals with signals representative of specified operational parameters associated with said problems to control the respective lengths of distinct batches of output data signals to be applied by said computer to said data outputting structures thereby to selectively utilize said data outputting structures in an optimal or near-optimal way.

2. A combination as in claim 1 further comprising a tape console connected to said computer for output batching thereon, and stored program controlled means included in said computer responsive to said signals supplied thereto by said control circuitry for selectively causing said computer to terminate batching on said tape console.

3. A combination as in claim 1 wherein said control circuitry is responsive to the relative busy or idle states of said outputting structures for supplying signals embodying optimal data processing times to said computer.

4. A combination as in claim 3 further comprising a tape console connected to said computer for output batching thereon, and stored program controlled means included in said computer responsive to said signals supplied thereto by said control circuitry for selectively causing said computer to terminate batching on said tape console.

5. A combination as in claim 4, wherein said stored program controlled means includes storage means for registering said signals supplied thereto by said control circuitry.

6. A combination as in claim 5 wherein said stored program controlled means further comprises means for registering in said storage means digital signals representative of the accumulated computer running time which elapsed while said tape console was connected thereto and additionally representative of the total accumulated output data processing time for said outputting structures generated by said computer while said tape console was connected thereto.

7. A combination as in claim 6 further comprising a plurality of tape reels selectively insertable in said tape console, and wherein said stored program controlled means additionally includes means for detecting whether or not a new tape reel has been inserted on said tape console.

8. A combination as in claim 7 wherein said stored program controlled means further comprises first accounting means for determining the elapsed time spent by said computer in processing an input job, second accounting means for determining the amount of output data processing time generated by said job, and means for registering said quantities determined by said first and second accounting means in said storage means.

9. A combination as in claim 8 wherein said stored program controlled means additionally comprises means for adding the quantities determined by said first accounting means to said stored accumulated computer elapsed time, and means for adding said output processing time information determined by said second accounting means to said accumulated data processing time included in said storage means.

10. A combination as in claim 9 wherein said stored program controlled means further comprises means for comparing said accumulated elapsed computer processing time included in said storage means with said optimal time therefore also included in said storage means.

11. A combination as in claim 10 wherein said stored program controlled means further comprises means for comparing the total accumulated output data processing time included in said storage means with said optimal time therefor also included in said storage means.

12. A combination as in claim 11 wherein said stored program controlled means further comprises means responsive to either of said comparing means detecting said optimal parameter being exceeded by said associated accumulated quantity for disconnecting said tape console from said computer.

13. A combination as in claim 12 wherein said stored program controlled means further comprises means for determining the relative operational status of said control circuitry.

14. In combination, a computer adapted to process a plurality of computational problems and to provide respective sets of output data signals for said problems, a plurality of tape consoles, means for selectively connecting said consoles to said computer, a plurality of data outputting structures, and control circuitry connected to said outputting structures, said control circuitry being responsive to the relative busy or idle status of said outputting structures for supplying signals embodying optimal data processing times to said computer for enabling said connecting means to selectively join said tape consoles and said computer to control the respective lengths of distinct batches of output data signals applied to said consoles by said computer, said computer including means responsive to the signals from said control circuitry for determining, based on a comparison between said signals and signals representative of specified operational parameters associated with the problems whose output signals have been applied to the currently-employed tape console, whether or not the currently-employed tape console should be designated to receive the output signals associated with the next computational problem.

15. A combination as in claim 14 wherein said means included in said computer comprises stored program controlled means responsive to said signals supplied thereto by said control circuitry for selectively connecting said tape consoles to said computer.

16. A combination as in claim 15 wherein said control circuitry comprises a plurality of switches for respectively supplying digital information to said computer.

17. A combination as in claim 16 wherein said switches comprise a plurality of ganged wafers, a plurality of terminals on said wafers, and shorting means included in each wafer for continuously contacting an associated outputting one of said terminals and for selectively contacting the remainder of said associated terminals.

18. A combination as in claim 17 further comprising a plurality of signal translation conductors connecting said computer and said control circuitry, selected ones of said conductors being connected to said outputting terminals included on selected ones of said switches.

19. A combination as in claim 18 wherein said control circuitry further comprises a relay including an enabling winding and a plurality of contact pairs, said contact pairs selectively multiply connecting said switch outputting terminals with said signal translation conductors, and said relay winding being selectively energized by said data outputting structures.

20. A combination as in claim 19 wherein said data outputting structures comprise a plurality of additional computers, a plurality of printers and a plurality of card punches, said printers and said card punches being controlled by said additional computers.

21. In combination, a computer, a plurality of data outputting structures, a plurality of storage means, means for respectively applying sets of data output signals resulting from computational problems processed by said computer to a specified one of said storage means and for routing data output signals from said storage means to said data outputting structures, control circuitry for supplying data output batching control signals to said computer, and means included in said computer responsive to said batching control signals for determining at the completion of each computational problem processed by said computer, by comparing said batching control signals with signals representative of selected operational parameters of the problems whose data output signals have been applied to the currently-employed storage means, whether the currently-employed storage means for the problem just processed should be employed for the next computational problem or whether another storage means should be specified to receive the next set of data output signals.

References Cited

UNITED STATES PATENTS

| | | | |
|---|---|---|---|
| 3,061,192 | 10/1962 | Terzian | 235—157 |
| 3,351,910 | 10/1967 | Miller et al. | 340—172.5 |

OTHER REFERENCES

IBM System 1360 Principles of Operation, IBM Systems Reference Library, form A22–6821–1, file No. S360–01.

PAUL J. HENON, *Primary Examiner.*

I. S. KAVRUKOV, *Assistant Examiner.*